(12) United States Patent
Greene et al.

(10) Patent No.: US 7,543,740 B2
(45) Date of Patent: Jun. 9, 2009

(54) FRAUD ANALYST SMART COOKIE

(75) Inventors: Todd Greene, Alpharetta, GA (US);
David Helsper, Marietta, GA (US)

(73) Assignee: Digital Envoy, Inc., Norcross, GA (US)

( * ) Notice: Subject to any disclaimer, the term of this patent is extended or adjusted under 35 U.S.C. 154(b) by 0 days.

(21) Appl. No.: 11/411,660

(22) Filed: Apr. 26, 2006

(65) Prior Publication Data
US 2007/0038568 A1  Feb. 15, 2007

Related U.S. Application Data

(63) Continuation-in-part of application No. 11/209,885, filed on Aug. 23, 2005, which is a continuation-in-part of application No. 10/943,454, filed on Sep. 17, 2004.

(51) Int. Cl.
*G06K 5/00* (2006.01)
(52) U.S. Cl. .................. 235/380; 235/375; 235/382
(58) Field of Classification Search .............. 235/380, 235/375, 382, 487; 705/41, 53, 67, 64, 57
See application file for complete search history.

(56) References Cited

U.S. PATENT DOCUMENTS

| | | | |
|---|---|---|---|
| 4,939,726 A | 7/1990 | Flammer et al. | |
| 5,042,032 A | 8/1991 | Dighe et al. | |
| 5,115,433 A | 5/1992 | Baran et al. | |
| 5,488,608 A | 1/1996 | Flammer et al. | |
| 5,490,252 A | 2/1996 | Macera et al. | |
| 5,862,339 A | 1/1999 | Bonnaure et al. | |
| 5,878,126 A | 3/1999 | Velamuri et al. | |
| 5,878,139 A | 3/1999 | Rosen | |
| 5,948,061 A | 9/1999 | Merriman et al. | |
| 6,012,088 A | 1/2000 | Li et al. | |
| 6,029,154 A | 2/2000 | Pettitt | |
| 6,035,332 A | 3/2000 | Ingrassia, Jr. et al. | |
| 6,102,406 A | 8/2000 | Miles et al. | 273/430 |
| 6,108,642 A | 8/2000 | Findley | |
| 6,122,624 A | 9/2000 | Tetro | |
| 6,130,890 A | 10/2000 | Leinwand et al. | |
| 6,151,631 A | 11/2000 | Ansell et al. | |

(Continued)

FOREIGN PATENT DOCUMENTS

WO   WO 99/34305   7/1999

OTHER PUBLICATIONS

U.S. Appl. No. 60/194,761, filed Apr. 3, 2000, Christopher Herringshaw, et al., Inventor.

(Continued)

*Primary Examiner*—Edwyn Labaze
(74) *Attorney, Agent, or Firm*—Ballard Spahr Andrews & Ingersoll, LLP

(57) ABSTRACT

A fraudulent business transaction application (FBTA) is provided in embodiments of the present invention for monitoring fraudulent transactions. When a consumer supplies account access information in order to carry out an Internet business transaction, the FBTA uses an online fraud mitigation engine to detect phishing intrusions and identity theft. Embodiments are also provided for calculating travel velocity and transaction frequency, which are useful for determining a fraudulent transaction. Further embodiments are provided for authenticating a transaction using a cookie stored on a client device and a behavior profile stored on a server.

10 Claims, 12 Drawing Sheets

ONLINE FRAUD MITIGATION ENGINE

U.S. PATENT DOCUMENTS

| | | | |
|---|---|---|---|
| 6,185,598 B1 | 2/2001 | Farber et al. | |
| 6,205,480 B1* | 3/2001 | Broadhurst et al. | 709/225 |
| 6,275,470 B1 | 8/2001 | Ricciuli | |
| 6,327,574 B1 | 12/2001 | Kramer et al. | 705/14 |
| 6,330,546 B1 | 12/2001 | Gopinathan | |
| 6,338,082 B1 | 1/2002 | Schneider | |
| 6,374,359 B1 | 4/2002 | Shrader et al. | 713/201 |
| 6,421,726 B1 | 7/2002 | Kenner et al. | |
| 6,425,000 B1 | 7/2002 | Carmello et al. | |
| 6,526,450 B1 | 2/2003 | Zhang et al. | |
| 6,546,493 B1 | 4/2003 | Magdych | |
| 6,697,824 B1 | 2/2004 | Bowman-Amuah | 709/229 |
| 6,714,918 B2 | 3/2004 | Hillmer et al. | |
| 6,715,080 B1 | 3/2004 | Starkovich et al. | 713/201 |
| 6,745,333 B1 | 6/2004 | Thomsen | 713/201 |
| 6,757,740 B1 | 6/2004 | Parekh | |
| 6,839,692 B2 | 1/2005 | Carrott et al. | 705/64 |
| 6,851,062 B2 | 2/2005 | Hartmann et al. | 713/201 |
| 6,859,791 B1 | 2/2005 | Spagna et al. | 705/51 |
| 6,868,525 B1* | 3/2005 | Szabo | 715/738 |
| 6,878,126 B2 | 4/2005 | Nelson et al. | 602/26 |
| 6,941,285 B2* | 9/2005 | Sarcanin | 705/67 |
| 6,965,881 B1 | 11/2005 | Brickell et al. | 705/76 |
| 6,973,489 B1 | 12/2005 | Levy | 709/224 |
| 6,983,379 B1* | 1/2006 | Spalink et al. | 705/10 |
| 6,986,160 B1 | 1/2006 | LeGrow | 726/1 |
| 7,020,622 B1 | 3/2006 | Messer | 705/26 |
| 7,058,597 B1 | 6/2006 | Ronning et al. | 705/26 |
| 7,072,984 B1* | 7/2006 | Polonsky et al. | 709/246 |
| 7,167,844 B1* | 1/2007 | Leong et al. | 705/80 |
| 7,185,085 B2 | 2/2007 | Bean | 709/224 |
| 7,203,315 B1 | 4/2007 | Livesay | 380/255 |
| 7,373,524 B2 | 5/2008 | Motsinger et al. | 713/194 |
| 2001/0051876 A1 | 12/2001 | Seigel et al. | 705/1 |
| 2002/0010679 A1 | 1/2002 | Felsher | 705/51 |
| 2002/0010776 A1* | 1/2002 | Lerner | 709/225 |
| 2002/0016831 A1 | 2/2002 | Peled et al. | |
| 2002/0023053 A1* | 2/2002 | Szoc et al. | 705/39 |
| 2002/0029267 A1 | 3/2002 | Sankuratripati et al. | 709/224 |
| 2002/0069079 A1 | 6/2002 | Vega | 705/1 |
| 2002/0099649 A1 | 7/2002 | Lee et al. | |
| 2002/0128977 A1* | 9/2002 | Nambiar et al. | 705/64 |
| 2002/0169669 A1 | 11/2002 | Stetson et al. | 705/14 |
| 2002/0188712 A1 | 12/2002 | Caslin et al. | |
| 2002/0194119 A1 | 12/2002 | Wright et al. | |
| 2003/0023715 A1 | 1/2003 | Reiner et al. | 709/224 |
| 2003/0110293 A1 | 6/2003 | Friedman | |
| 2003/0132298 A1 | 7/2003 | Swartz et al. | 235/472.02 |
| 2003/0191765 A1 | 10/2003 | Bargh et al. | 707/100 |
| 2003/0204610 A1 | 10/2003 | Howard | |
| 2003/0208684 A1 | 11/2003 | Camacho et al. | |
| 2004/0117321 A1 | 6/2004 | Sancho | |
| 2004/0128390 A1* | 7/2004 | Blakley et al. | 709/228 |
| 2004/0199462 A1 | 10/2004 | Starrs | |
| 2005/0033641 A1 | 2/2005 | Jha et al. | 705/14 |
| 2005/0071417 A1 | 3/2005 | Taylor | |
| 2005/0076230 A1 | 4/2005 | Redenbaugh | |
| 2005/0097320 A1* | 5/2005 | Golan et al. | 713/166 |
| 2005/0108102 A1 | 5/2005 | York | |
| 2005/0120221 A1 | 6/2005 | Arnold | |
| 2005/0262556 A1 | 11/2005 | Waisman | |
| 2006/0010072 A1 | 1/2006 | Eisen | |
| 2006/0015727 A1 | 1/2006 | Birk et al. | 713/171 |
| 2006/0056418 A1 | 3/2006 | Rizzuto | |
| 2006/0146820 A1 | 7/2006 | Friedman | |
| 2006/0282285 A1 | 12/2006 | Helsper et al. | 705/1 |
| 2006/0282660 A1* | 12/2006 | Varghese et al. | 713/155 |
| 2007/0067297 A1 | 3/2007 | Kublickis | 707/9 |
| 2008/0010678 A1 | 1/2008 | Burdette et al. | 726/15 |

OTHER PUBLICATIONS

U.S. Appl. No. 60/241,776, filed Oct. 18, 2000, Brad Doctor, et al., Inventor.

*Content Delivery Services: Footprint Streaming Solutions*, Brochure from Digital Island.

*TraceWire White Paper*, Brochure from Digital Island, Jun. 1999.

*We Know Where You Live*, Scott Woolley, Forbes Magazine, Nov. 13, 2000.

*Nicname/Whois*, Internet Engineering Task Force, Request for Comments 954.

*A Primer on Internet and TCT/IP Tools and Utilities*, Internet Engineering Task Force, Request for Comments 2151.

*Domain Name System Security Extensions*, Internet Engineering Task Force, Request for Comments 2535.

Linda Punch, *Relief for the Chargeback Blues*, Credit Card Management, Jul. 2004, at 30.

Gary G. Weishaar, *Attacking Internet Fraud*, Business Credit, Jun. 2005, at 38.

Alan R. Earls, *Fraud-Busters*, Computerworld, Jun. 16, 2003, vol. 37, Issue 24, at 35.

Todd Spangler, *They Know—Roughly—Where You Live*, Interactive Week, Aug. 20, 2001, vol. 8, Issue 32, at 39.

Article on "Credit Card Fraud Prevention Using NET Framework in C# or VB.NET"; www.ip2location.com/articles/article8.htm; Jul. 18, 2006; pp. 1-3.

Lisa Valentine, *The "fraudsters' playground"*, ABA Banking Journal, Aug. 2003, vol. 95, Issue 8, at 39.

Orla O'Sullivan, *Silver Lining In Web Fraud, Hackers and other online low-lifes just might be good for business*, Bank Technology News, Jul. 2000, vol. 13, No. 7, at 1.

Pimm Fox, *Site Monitors Get Real*, Computerworld, Jun. 16, 2003, vol. 37, Issue 24, at 18.

Marie Alexander, *Location, Location, Geolocation*, Retail Merchandiser, Nov. 2002, vol. 42, Issue 11, at 42.

John Pallatto, *Tracking Online Thieves*, Internet World, Jan. 2002, vol. 8, Issue 1, at 18.

Brian Fonseca, *Keeping Internet-business fraud in check*, InfoWorld, Mar. 13, 2000, vol. 22, Issue 11, at 28.

Terry Corbitt, *Credit Card Fraud*, Credit Management, Mar. 2003, at 31.

Wenke Lee et al., *Data Mining Approaches for Intrusion Detection*, Seventh USENIX Security Symposium, Conference Proceedings, Jan. 26-29, 1998, at 79.

Robert Stone, *CenterTrack: An IP Overlay Network for Tracking DoS Floods*, 9th USENIX Security Symposium, Conference Proceedings, Aug. 14-17, 2000, at 199.

Dawn Xiaodong Song et al., *Timing Analysis of Keystrokes and Timing Attacks on SSH*, 10th USENIX Security Symposium, Conference Proceedings, Aug. 13-17, 2001, at 337.

Thomer M. Gil et al., *MULTOPS: a data-structure for bandwidth attack detection*, 20th USENIX Security Symposium, Conference Proceedings, Aug. 13-17, 2001, at 23.

Tao Peng et al., *Protection from Distributed Denial of Service Attacks Using History-based IP Filtering*, 2003 International Conference on Communications, IEEE Part vol. 1, May 2003, at 482.

Steven J. Templeton et al., *Detecting Spoofed Packets*, Proceedings of the DARPA Information Survivability Conference and Exposition, IEEE Computer Society, 2003.

Philip K. Chan et al., *Distributed Data Mining in Credit Card Fraud Detection*, IEEE, Nov./Dec. 1999, at 67.

Jianyoung Tuo et al., *Artificial Immune System for Fraud Detection*, 2004 IEEE International Conference on Systems, Man and Cybernetics, at 1407.

Fred Cohen, *Credit Creeps*, Computer Fraud & Security, Jan. 2003, at 16.

*Digital Island: TraceWare White Paper*, Brochure from Digital Island, Jun. 1999.

International Search Report for PCT/US07/08760, dated mailed Sep. 24, 2007.

* cited by examiner

ONLINE FRAUD MITIGATION ENGINE

OFME PROCESSING SYSTEM

CALCULATING TRAVEL VELOCITY

CALCULATING TRAVEL VELOCITY

CALCULATING A USER'S TRAVEL VELOCITY**

DETERMINING A FRAUDULENT TRANSACTION

DETERMINING A FRAUDULENT TRANSACTION

Exemplary Operating Environment

AUTHENTICATING A TRANSACTION

AUTHENTICATING A TRANSACTION

AUTHENTICATING A TRANSACTION

FRAUD ANALYST SMART COOKIE

CROSS-REFERENCE TO RELATED APPLICATIONS

This application is a continuation-in-part of U.S. application Ser. No. 11/209,885, filed on Aug. 23, 2005, which is a continuation-in-part of U.S. application Ser. No. 10/943,454, filed on Sep. 17, 2004, which are each herein incorporated by reference in their entirety.

BACKGROUND OF THE INVENTION

1. Field of the Invention

The present invention relates to techniques for detecting fraudulent online transactions. The present invention provides methods, systems, and computer program products for operating a fraud engine that is capable of accepting an IP address and a number of factors relating to an end user in order to determine whether a transaction is fraudulent.

The present invention also relates to methods, systems, and computer program products for calculating a travel velocity between two access locations, determining if a transaction is fraudulent based on a user's travel velocity between two access locations, and determining if a transaction is fraudulent based on a transaction frequency. The present invention further relates to methods, systems, and computer program products for authenticating a transaction by comparing one or more factors stored in a cookie on a client device with one or more factors stored in a behavior profile associated with a user.

2. Description of the Related Art

The ease of hiding an identity on the Internet makes it difficult for financial services organizations to carry the "know your customer" mantra to the online world. In 2003 alone, Internet-related fraud accounted for 55% of all fraud reports according to the Federal Trade Commission, up nearly 45% from the previous year. In order for financial services organizations to continue successfully serving more of their customers online, creating a safe and secure environment is a top priority. Accordingly, there is a need and desire for a methods, systems, and computer program products for detecting and preventing fraudulent online transactions as well as a need for methods, systems, and computer program products for authenticating online transactions.

SUMMARY OF THE INVENTION

One embodiment of the present invention provides methods, systems, and computer program products (hereinafter "method" or "methods" for convenience) for determining fraudulent online transactions. In one embodiment, an end user inputs parameters and rules concerning a particular transaction into the system. Based on the parameters, rules, and other information concerning a particular transaction, the system computes a score associated with the likelihood that the transaction is fraudulent. The score is then compared with various thresholds which may be set by the end user. If the score exceeds the thresholds, then the transaction is determined to be fraudulent. Data regarding the transaction may also be output to the end user. Upon review, the end user may change the fraud status of a given transaction.

Another embodiment of the present invention provides methods, systems, and computer program products for calculating a travel velocity between a first and second access location, utilizing a travel velocity to determine if a transaction is fraudulent, as well as determining if a transaction is fraudulent based upon a computed transaction frequency.

A further embodiment of the present invention provides methods, systems, and computer program products for authenticating a transaction performed by a user operating a client device which contains a cookie, wherein information stored in the cookie is compared with information stored in a behavior profile associated with the user.

It will be apparent to those skilled in the art that various devices may be used to carry out the systems, methods, or computer program products of the present invention, including cell phones, personal digital assistants, wireless communication devices, personal computers, or dedicated hardware devices designed specifically to carry out embodiments of the present invention. While embodiments of the present invention may be described and claimed in a particular statutory class, such as the system statutory class, this is for convenience only and one of skill in the art will understand that each embodiment of the present invention can be described and claimed in any statutory class, including systems, apparatuses, methods, and computer program products.

Unless otherwise expressly stated, it is in no way intended that any method or embodiment set forth herein be construed as requiring that its steps be performed in a specific order. Accordingly, where a method, system, or computer program product claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The foregoing and other advantages and features of the invention will become more apparent from the detailed description of exemplary embodiments of the invention given below with reference to the accompanying drawings.

Figure 1:
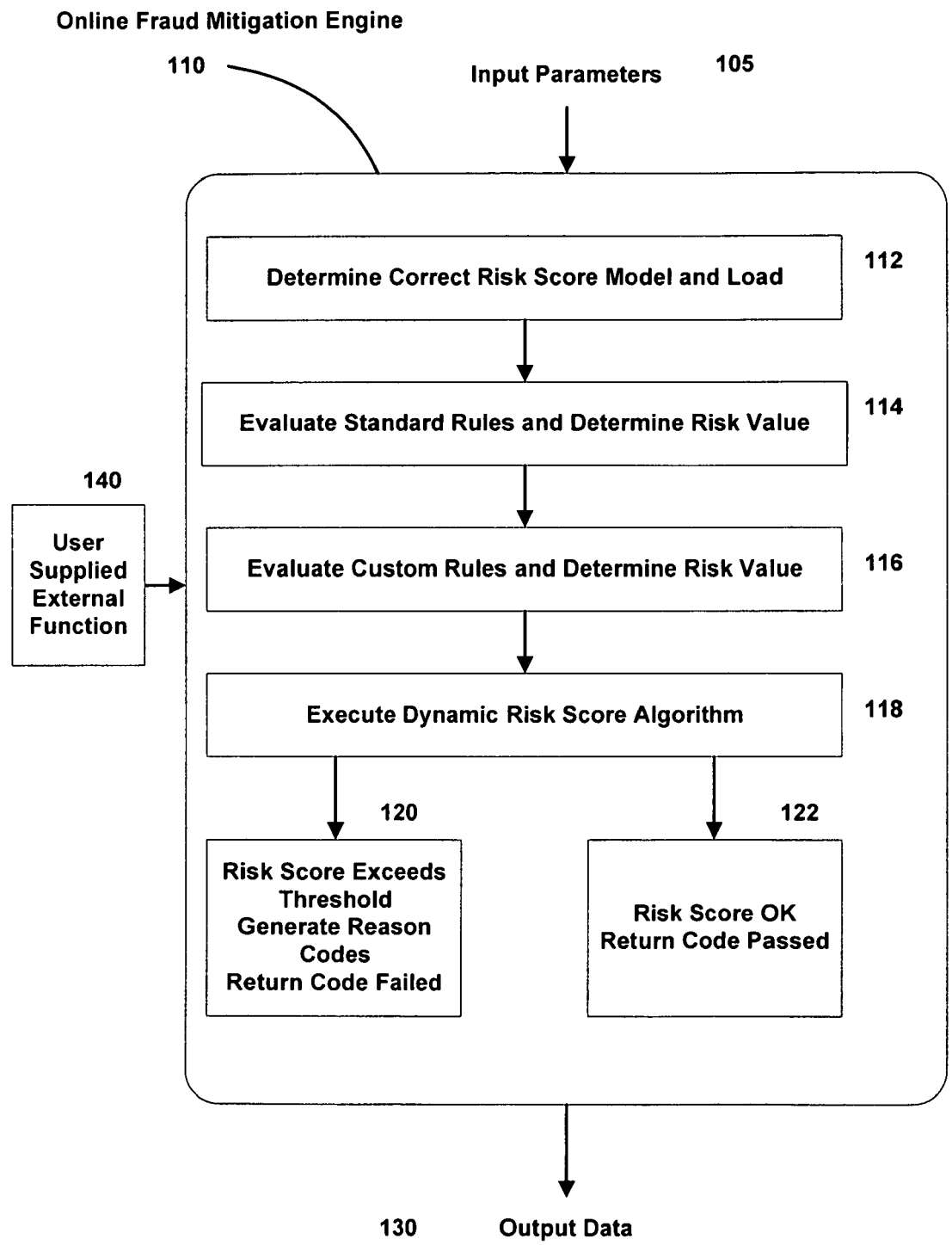
FIG. 1 is a flow chart illustrating one embodiment of the present invention for determining whether an online transaction is fraudulent using an Online Fraud Mitigation Engine.

In the following detailed description, reference is made to the accompanying drawings, which form a part hereof, and in which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

DETAILED DESCRIPTION OF THE INVENTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

The term "risk factor" includes any factor used in a transaction that has some level of risk associated with it.

The term "static risk factor" includes any factor that does not change at run time.

The term "dynamic risk factor" includes any factor that has its value calculated at run time.

The term "risk value" includes any number associated with a factor.

The term "risk weight" includes any number that determines how much influence a factor's risk value is to the outcome of a risk score.

The term "rule" includes any conditional statement that applies Boolean logic to risk values.

The term "risk score" includes any aggregation of risk values based on a computation of risk values and risk weights or a rule setting the risk score directly.

The term "online fraud mitigation engine" (OFME) includes any component of the present invention that accepts an IP address along with a number of factors to thereby create a risk score for a given transaction which can be used to determine if the transaction is fraudulent.

The term "transaction" includes any type of online activity, such as online banking account access, credit card transactions, online bill pay, wire transfers, stock trades, transactions utilizing personal information, and the like.

The term "transaction identifier" includes any unique system generated number that identifies a particular risk score model.

The term "risk score model" includes any set of logical rules, applicable static and dynamic factors, risk weights for the factors, a fraud score algorithm, a risk score threshold, and reason codes used to identify a fraudulent transaction.

The term "user" or "client" includes one or more persons, entities, or computers.

The terms "method(s)", "system(s)", and "computer program product(s)" may be used interchangeably within various embodiments of the present invention.

Figure 8:
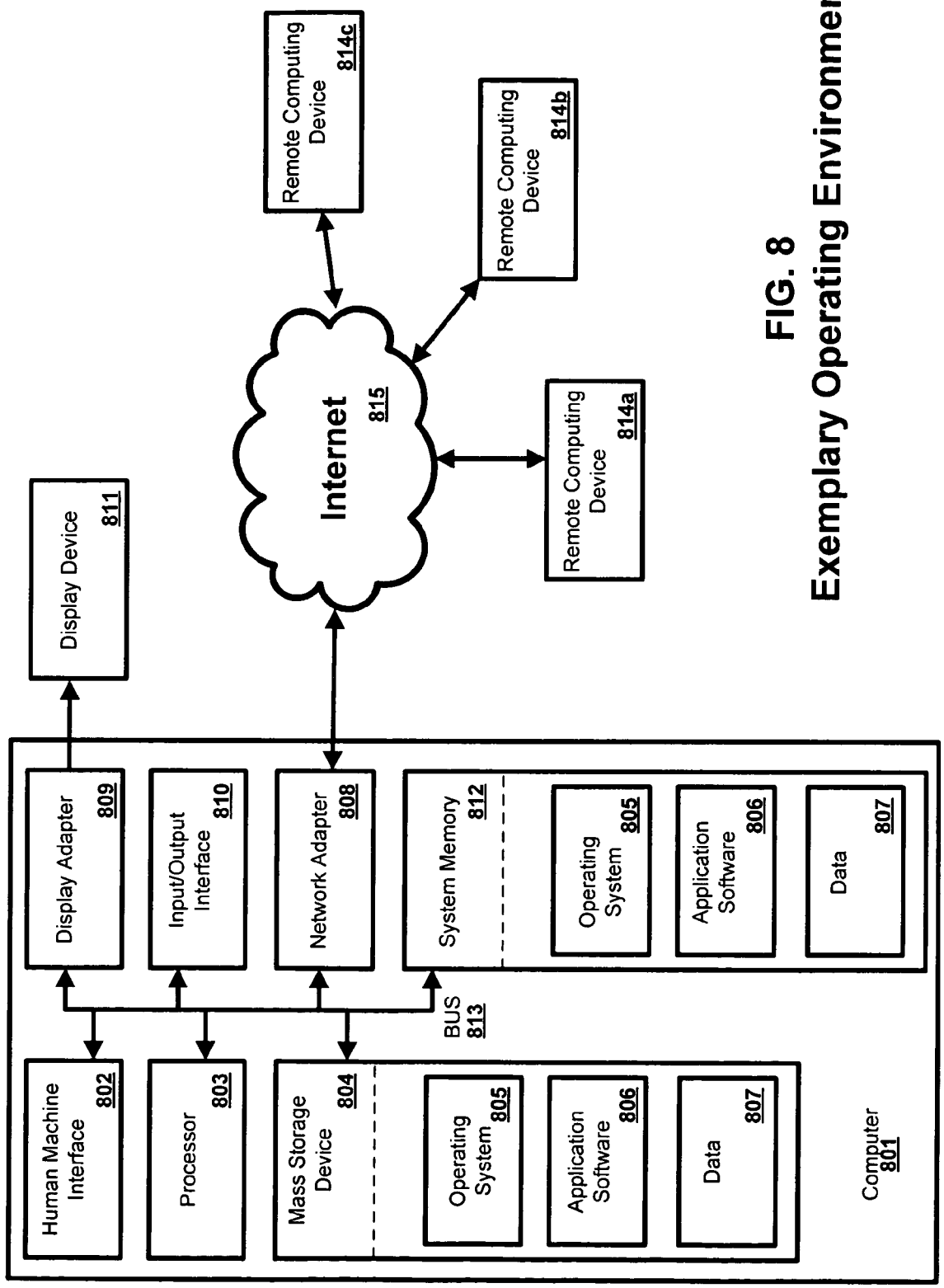
FIG. 8 shows a logical overview of a computer system which may be used to carry out the various embodiments of the present invention.

The methods of the present invention can be carried out using a processor programmed to carry out the various embodiments of the present invention. FIG. 8 is a block diagram illustrating an exemplary operating environment for performing the various embodiments. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 801. The components of the computer 801 can include, but are not limited to, one or more processors or processing units 803, a system memory 812, and a system bus 813 that couples various system components including the processor 803 to the system memory 812.

The processor 803 in FIG. 8 can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC.

The system bus 813 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCD bus also known as a Mezzanine bus. This bus, and all buses specified in this description can also be implemented over a wired or wireless network connection. The bus 813, and all buses specified in this description can also be implemented over a wired or wireless network connection and each of the subsystems, including the processor 803, a mass storage device 804, an operating system 805, application software 806, data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The operating system 805 in FIG. 8 includes operating systems such as MICROSOFT WINDOWS XP, WINDOWS 2000, WINDOWS NT, or WINDOWS 98, and REDHAT LINUX, FREE BSD, or SUN MICROSYSTEMS SOLARIS. Additionally, the application software 806 may include web browsing software, such as MICROSOFT INTERNET EXPLORER or MOZILLA FIREFOX, enabling a user to view HTML, SGML, XML, or any other suitably constructed document language on the display device 811.

The computer 801 typically includes a variety of computer readable media. Such media can be any available media that is accessible by the computer 801 and includes both volatile and non-volatile media, removable and non-removable media. The system memory 812 includes computer readable media in the form of volatile memory, such as random access memory (RAM), and/or non-volatile memory, such as read only memory (ROM). The system memory 812 typically contains data such as data 807 and and/or program modules such as operating system 805 and application software 806 that are immediately accessible to and/or are presently operated on by the processing unit 803.

The computer 801 may also include other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 804, including by way of example, an operating system 805 and application software 806. Each of the operating system 805 and application software 806 (or some combination thereof) may include elements of the programming and the application software 806. Data 807 can also be stored on the mass storage device 804. Data 804 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 801 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 803 via a human machine interface 802 that is coupled to the system bus 813, but may be connected by other interface and bus structures, such as a parallel port, serial port, game port, or a universal serial bus (USB).

A display device 811 can also be connected to the system bus 813 via an interface, such as a display adapter 809. For example, a display device can be a cathode ray tube (CRT) monitor or a Liquid Crystal Display (LCD). In addition to the display device 811, other output peripheral devices can include components such as speakers (not shown) and a printer (not shown) which can be connected to the computer 801 via Input/Output Interface 810.

The computer 801 can operate in a networked environment using logical connections to one or more remote computing devices 814*a,b,c*. By way of example, a remote computing device can be a personal computer, portable computer, a server, a router, a network computer, a peer device or other common network node, and so on. Logical connections between the computer 801 and a remote computing device 814*a,b,c* can be made via a local area network (LAN) and a general wide area network (WAN). Such network connections can be through a network adapter 808. A network adapter 808 can be implemented in both wired and wireless environments. Such networking environments are commonplace in offices, enterprise-wide computer networks, intranets, and the Internet 815.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of application software 806 may be stored on or transmitted across some form of computer readable media. An implementation of the disclosed method may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 9:
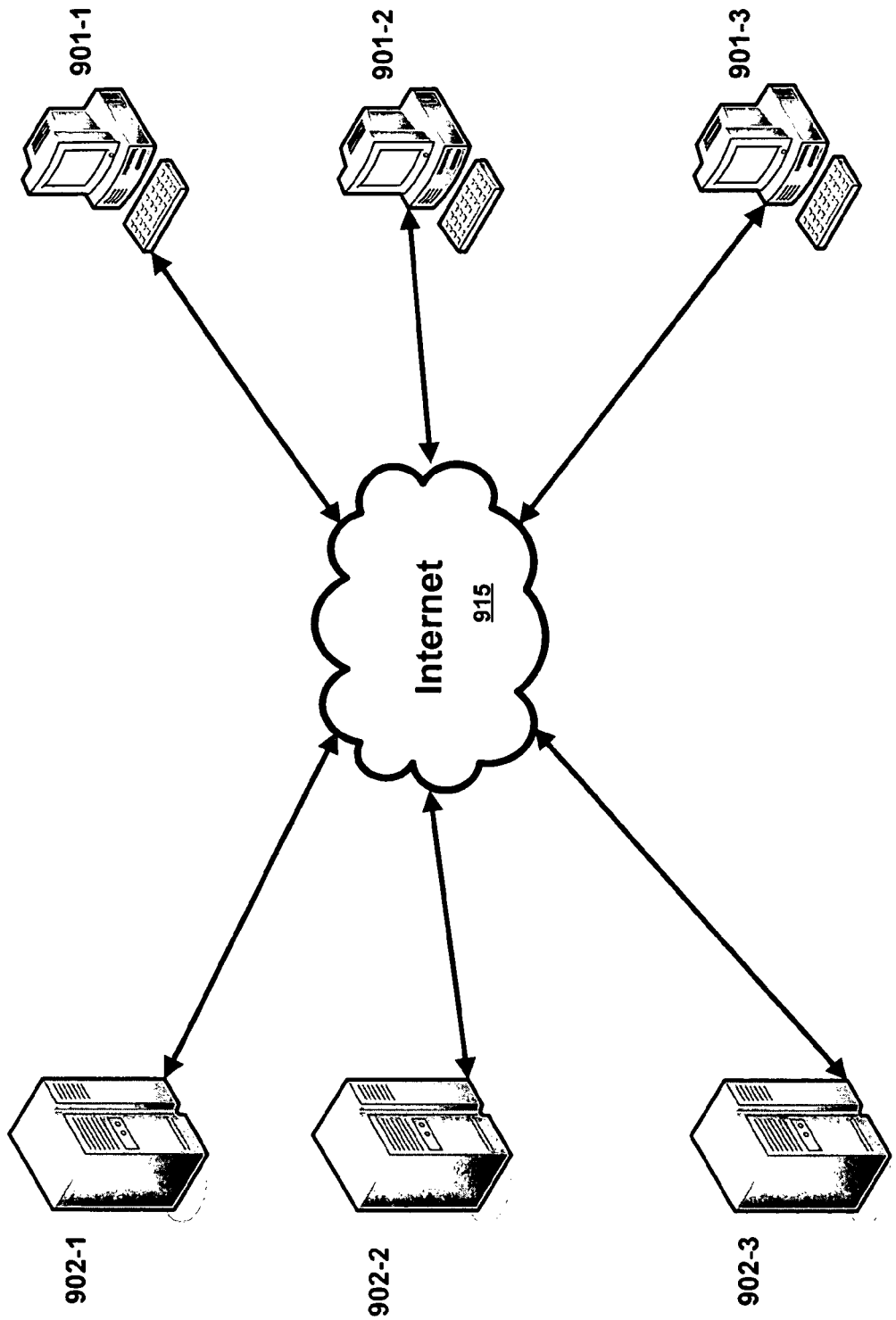
FIG. 9 illustrates logically the arrangement of computers connected to the Internet in one embodiment of the present invention.

FIG. 9 illustrates a logical overview of the Internet 815 of one embodiment of the present invention. One or more client computers 801, for example, such as the remote computing devices 814*a,b,c* depicted in FIG. 8, may be connected to the Internet 815 as depicted at 901-1, 901-2, and 901-3. Additionally, one or more computers 902-1, 902-2, and 902-3 of the type depicted at 801 may act as servers, providing web pages via HTTP request, database access, remote terminal services, digital file download or upload, or any other desired service. Furthermore, one or more client computers, such as 901-1, may act as an Internet accessible server computer 902-1, and vice versa.

Online Fraud Mitigation Engine

FIG. 1 is a flow chart illustrating steps for performing an online fraudulent transaction determination in accordance with one embodiment of the present invention. At step 105, input parameters are input into the OFME by an end user, for example, a banking institution. The OFME provides a runtime environment for the selected risk score model. The OFME provides a rules based engine for receiving input parameters; for example, a transaction identifier, an IP address, a date/time stamp, a unique identifier and a number of static factors for processing. The OFME subsequently retrieves relevant information regarding an Internet user's IP address; for example, the Internet user's location from a NetAcuity server. The operation of the NetAcuity server is discussed in U.S. patent application Ser. No. 09/832,959, which is commonly assigned to the assignee of the present application, which is herein incorporated by reference in its entirety.

A unique transaction identifier is associated with a given Internet based transaction and is used by the OFME to determine which risk score model should be utilized for a given transaction. The Fraud Risk Advisor uses the transaction identifier for tracking purposes. The results are then stored in a database.

Additional input parameters may be input into the OFME through end user supplied data. For example, the end user may utilize a hot file, suspect IP list, etc., which would be used by the OFME in the determination process. Once the OFME receives the specified input parameters, the Fraud Risk Advisor proceeds to step 112. In step 112, the end user will select from a set of standard risk score models or end user defined risk score models to be used for a particular determination.

After the OFME loads the appropriate risk score model, the present invention proceeds to step 114 in which the OFME evaluates a given set of factors and determines a risk value for each given factor. Once the risk value has been determined for each factor associated with the OFME, the present invention proceeds to step 116 in which the OFME evaluates a given set of rules and determines a risk score.

When the risk score has been determined by a rule match, the present embodiment proceeds to step 118 in which the OFME executes a risk score algorithm to determine an aggregate risk score. The OFME uses the standard risk value from the rules evaluation, as well as an optional static risk score to determine an aggregate risk score. For example, the rules based risk score could be assigned a value between 0 to 1,000. A risk score of 0 would be assigned to a transaction perceived to be highly fraudulent, while a risk score of 1,000 would be assigned to scores perceived to have a low risk of fraud.

Dependent on the risk score calculated in step 118 and threshold limits defined by an end user, the OFME determines whether the transaction proceeds to step 120 or step 122. If the score exceeds the predefined threshold level, the OFME proceeds to step 120 because the transaction is determined to be fraudulent. Accordingly, the transaction is flagged and forwarded to the end user for further review along with each factor value and a reason code for each factor value. If the score is within predetermined threshold limits, the OFME proceeds to step 122 because the transaction is determined to be valid. In the alternative, if the score is within predetermined threshold limits, the OFME could further authenticate the transaction using one or more embodiments of the present invention drawn to authenticating a transaction using a cookie and a behavior profile, such as the embodiments illustrated in FIGS. 10, 11, and 12.

At step 130, the end user receives output from the OFME for the pending transaction. If the transaction is determined to be fraudulent by the OFME, the end user receives the results from the OFME including factor values and reason codes for the transaction. In addition, the OFME will update the present invention's real-time statistics and store all relevant data, for example, the IP address, regarding the transaction in a database, even if the transaction is deemed valid. The stored data is used for both reporting purposes as well as analysis purposes for updating the risk score model's risk weights or removing certain factors or rules. The end user has the ability to override the results of the OFME and may flag a transaction determined to be valid as suspicious or deem a suspicious transaction valid.

Figure 2:
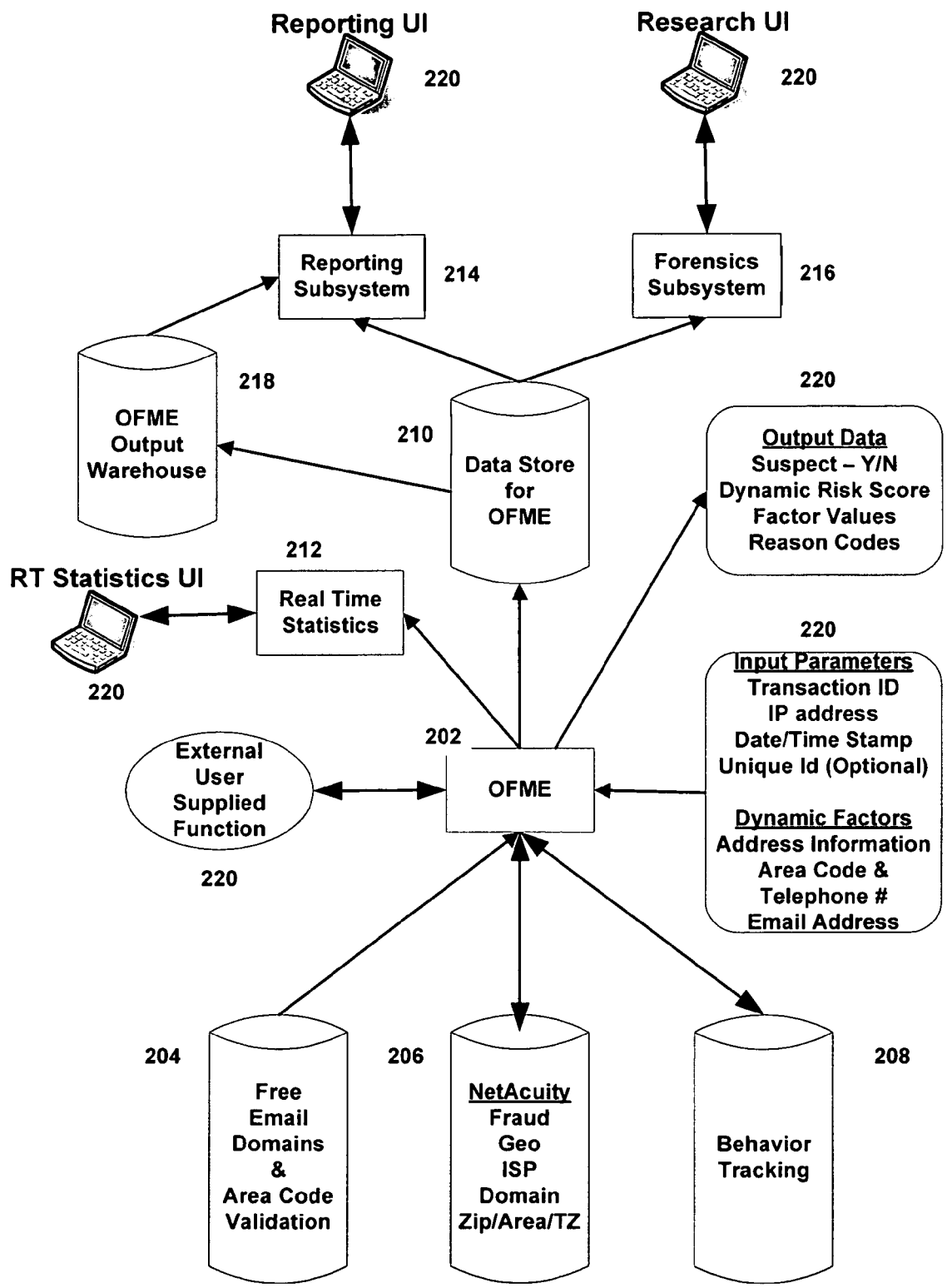
FIG. 2 is a block diagram of a computer system for implementing embodiments of the present invention.

FIG. 2 illustrates is an exemplary processing system 200 with which the invention may be used. System 200 includes a user interface 220 in which an end user may input parameters, rules, and user defined functions to the OFME 202. User interface 220 may comprise multiple user interfaces. The user interface 220 also receives output data from the OFME 202 regarding a certain transaction. The user interface 220 may be graphical or web based, or may use any other suitable input mechanism.

Once the OFME 202 receives data from the user interface 220, the OFME 202 acquires information associated with this data from, for example, a NetAcuity server 206, a validation server 204 and a behavior-tracking database 208. Validation server 204 validates email addresses and area codes supplied by the end user for a given transaction.

Behavior tracking database 208 uses a unique identifier associated with a given Internet user to determine whether a current Internet based transaction is in congruence with the normal behavior of the Internet user. The unique identifier can be anything useful to uniquely identify a user, such as a user name, debit card number, credit card number, bank account number, or social security number. The unique identifier may be user supplied in various embodiments, and can be stored in the searchable behavior-tracking database 208. When the Internet user performs an Internet based transaction, the behavior-tracking database 208 is searched and geographic data along with an ISP and domain, which may also be stored with the unique identifier, is retrieved, if available. This information is then compared to the geographic data, ISP, and domain information associated with a current IP address for the current pending Internet based transaction. The result of the comparison, an access behavior factor, is used to determine whether the current pending Internet based transaction is fraudulent. If an access behavior violation is determined, an automated challenge/response could be used to validate the Internet user accessing an account in real time. If there is no history for the current IP address available in the behavior-tracking database 208 for the Internet user, the current geographic data, ISP and domain information associated with the current IP address is added to the behavior-tracking database 208. Accordingly, when an Internet user is creating an account, access behavior would not be used as a factor for fraud detection. The behavior tracking database 208 may also be used to store one or more behavior profiles described in embodiments of the present invention.

The unique identifier assigned to the Internet user may store multiple access behaviors. In addition, because an Internet user may change their access behavior due to, for example, extended travel, change of residence, etc., the end user may override an access behavior violation returned by the OFME 202.

The OFME 202 uses the information supplied by the user interface 220, NetAcuity server 206, validation server 204 and behavior-tracking database 208 to determine a risk score associated with a given transaction. Once the OFME 202 computes the risk score, the risk score is sent along with any relevant information concerning the transaction to behavior tracking database 208, real time statistics database 212, user interface 220, and OFME data storage database 210.

In one embodiment, OFME data storage database 210 may transfer data received from OFME 202 to OFME output warehouse storage 218 for long-term storage. In addition, OFME data storage database 210 may transfer data received from OFME 202 to both a Reporting subsystem 214 and a Forensics subsystem 216 for processing and output to the user interface 220. Forensics subsystem 216 provides the end user the ability to look-up information generated by running a risk score model. Thus, the end user can determine why a transaction is deemed suspicious or why a transaction was not deemed suspicious. Reporting subsystem 214 provides various reports to the end user, for example, the number of transaction flagged as being suspicious.

Calculating Travel Velocity

In one embodiment of the present invention, a method is provided for calculating a travel velocity between a first access point and a second access point using a first and second IP address. Calculating a travel velocity has several practical uses, including determining a fraudulent transaction, network analysis, user profiling, user account verification and tracking, network access provider analysis, and advertising. Travel velocity may also be a factor utilized by the OFME 202 to determine a fraudulent transaction.

Figure 3:
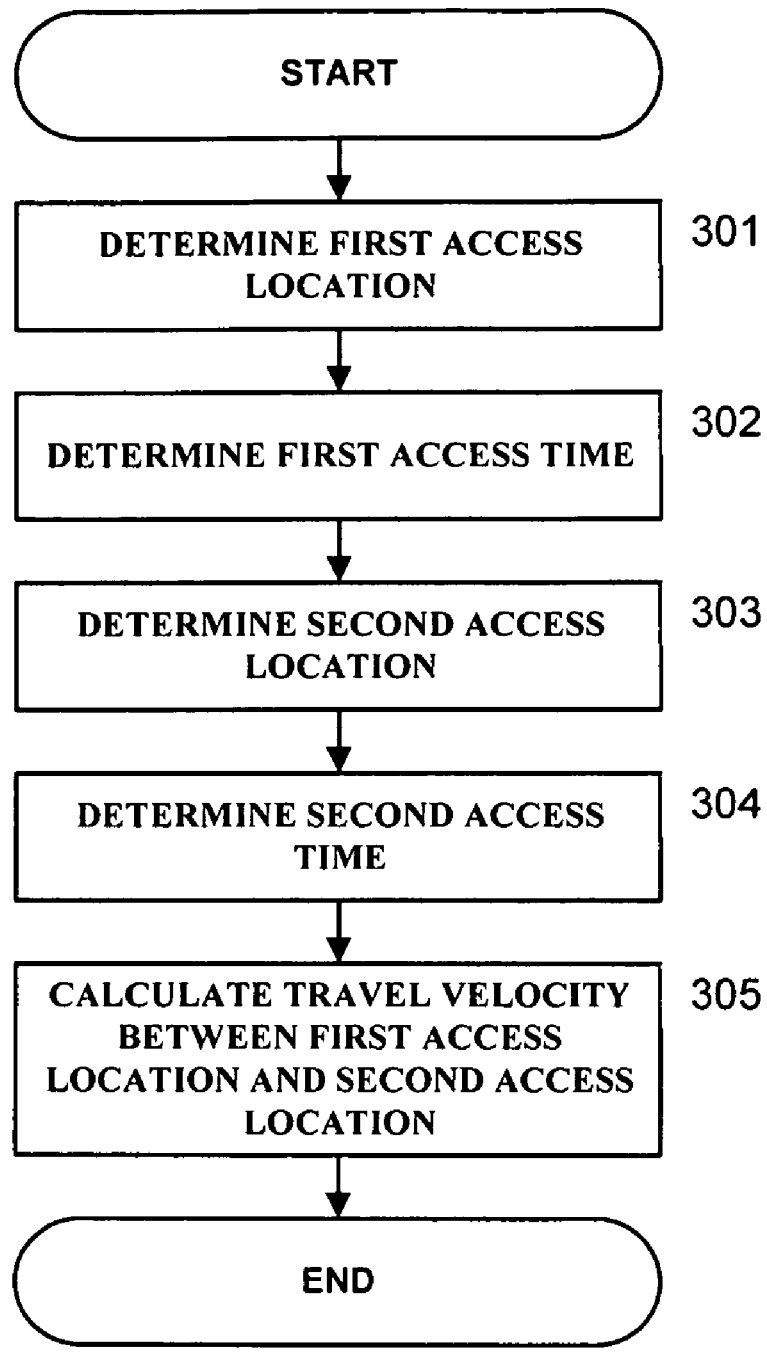
FIG. 3 illustrates one embodiment of the present invention useful for calculating a travel velocity.

FIG. 3 illustrates one embodiment of the present invention useful for calculating travel velocity. First, a first access location is determined based on a first Internet Protocol ("IP") address 301. Second, a first access time is determined 302. Third, a second access location is determined based on a second IP address 303. Fourth, a second access time is determined 304. Finally, the travel velocity between the first access location and the second access location is calculated 305 as a function of the first access location 301 and the first access time 302, and the second access location 303 and the second access time 304.

Figure 4:
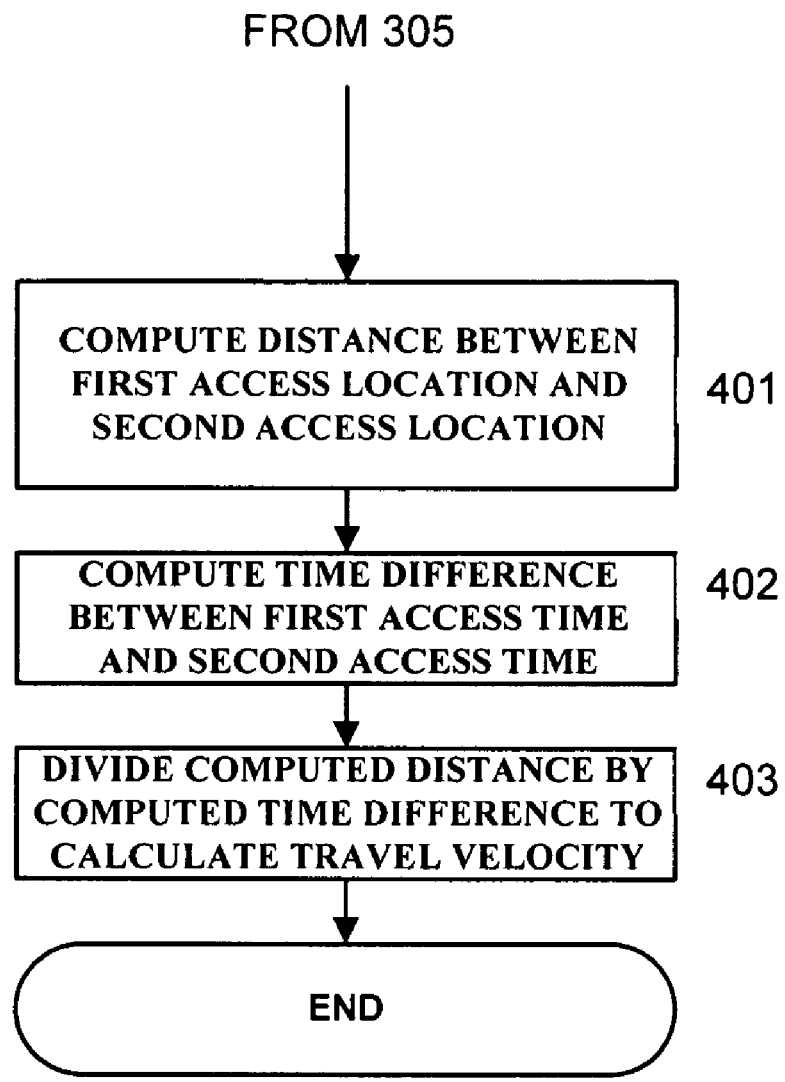
FIG. 4 illustrates another embodiment of the present invention useful for calculating a travel velocity.

A further embodiment of the present invention useful for calculating a travel velocity is logically illustrated in FIG. 4. While the embodiment of FIG. 4 continues from step 305 of FIG. 3, no particular order of steps is expressly or implicitly required. In this embodiment, a distance between the first access location 301 and the second access location 303 is computed 401. Second, a time difference is computed 402 between the first access time 302 and a second access time 304. Third, the travel velocity is calculated 403 between the first access location 301 and the second access location 303 by dividing the computed distance 401 by the computed time difference 402.

For illustration purposes only, according to the embodiment of FIG. 4, suppose that the first IP address is 24.131.36.54, and the first access time 302 is 1:00 PM EST. Methods for determining the location corresponding to an IP address, such as those provided by a NetAcuity server, are used to determine that the first IP address corresponds to the first location 301 of Atlanta, Ga., USA. Next, a second IP address of 144.214.5.246 is provided, and the second access time 304 is 1:05 PM EST. Again, methods are used to determine that 144.214.5.246 corresponds to a second access location 303 of Hong Kong, China.

Next, the distance between the first access location 301 of Atlanta, and the second access location 303 of Hong Kong, is computed 401 to be approximately 8405 miles. The computed time difference 402 between the first access time 302 of 1:00 PM EST and the second access time 304 of 1:05 PM EST is 5 minutes. Then, the computed distance 401 of 8405 miles is divided by the time difference 402 of 5 minutes, to calculate a travel velocity 403 of 8405 miles/5 minutes, or 100,860 miles per hour, which is suspiciously high.

Calculating a User's Travel Velocity

In one embodiment of the present invention, a method is provided for calculating a user's travel velocity between a first access location and a second access location using a first and second IP address. Calculating a user's travel velocity has several practical uses, including determining a fraudulent transaction, network analysis, user profiling, user account verification and tracking, network access provider analysis, and advertising. A user's travel velocity may also be a factor utilized by the OFME 202 to determine a fraudulent transaction.

Figure 5:
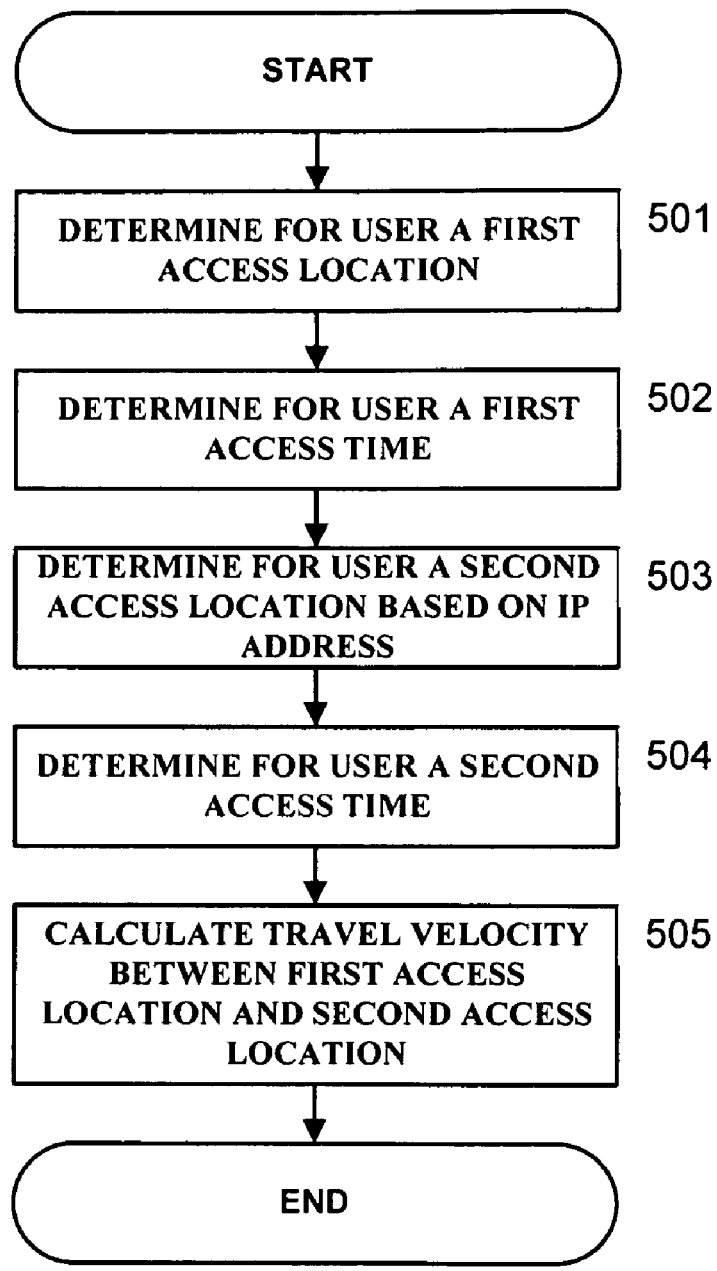
FIG. 5 illustrates one embodiment of the present invention useful for calculating a user's travel velocity.

FIG. 5 illustrates one embodiment of the present invention useful for calculating a user's travel velocity. First, a first access location 501 is determined for a user. The first access location 501 may be determined in a variety of ways, such as using the user's IP address to determine the first access location 501, retrieving the first access location 501 from the user's behavior profile, or by using a user supplied first access location 501.

Second, a first access time 502 is determined for the user. A second access location is then determined for the user 503 based on the IP address of the user. Fourth, a second access time is determined for the user 504. Then, the method of the present embodiment calculates the travel velocity 505 of the user between the first access location 501 and the second access location 503. The user's travel velocity may be calculated using a variety of methods, including the method embodied in FIG. 4.

In a further embodiment based on FIG. 5, the first access location 501 and the first access time 502 are determined from a behavior profile associated with the user. In other embodiments, the first access location 501 can be determined based on the user's last valid access location. In another embodiment, the second access location 503 and the second access time 504 are the user's current access location and current access time.

Determining a Fraudulent Transaction

In one embodiment of the present invention, a method is provided for determining if a transaction is fraudulent by using a user's travel velocity as a fraud factor. Determining if a transaction is fraudulent based upon a user's travel velocity has several practical uses, such as stopping and deterring the theft and use of personal information online, which may result from identify theft, phishing emails, hacking, spy ware, Trojans, and the like. Likewise, the same method may be used to determine if a transaction is legitimate.

Figure 6:
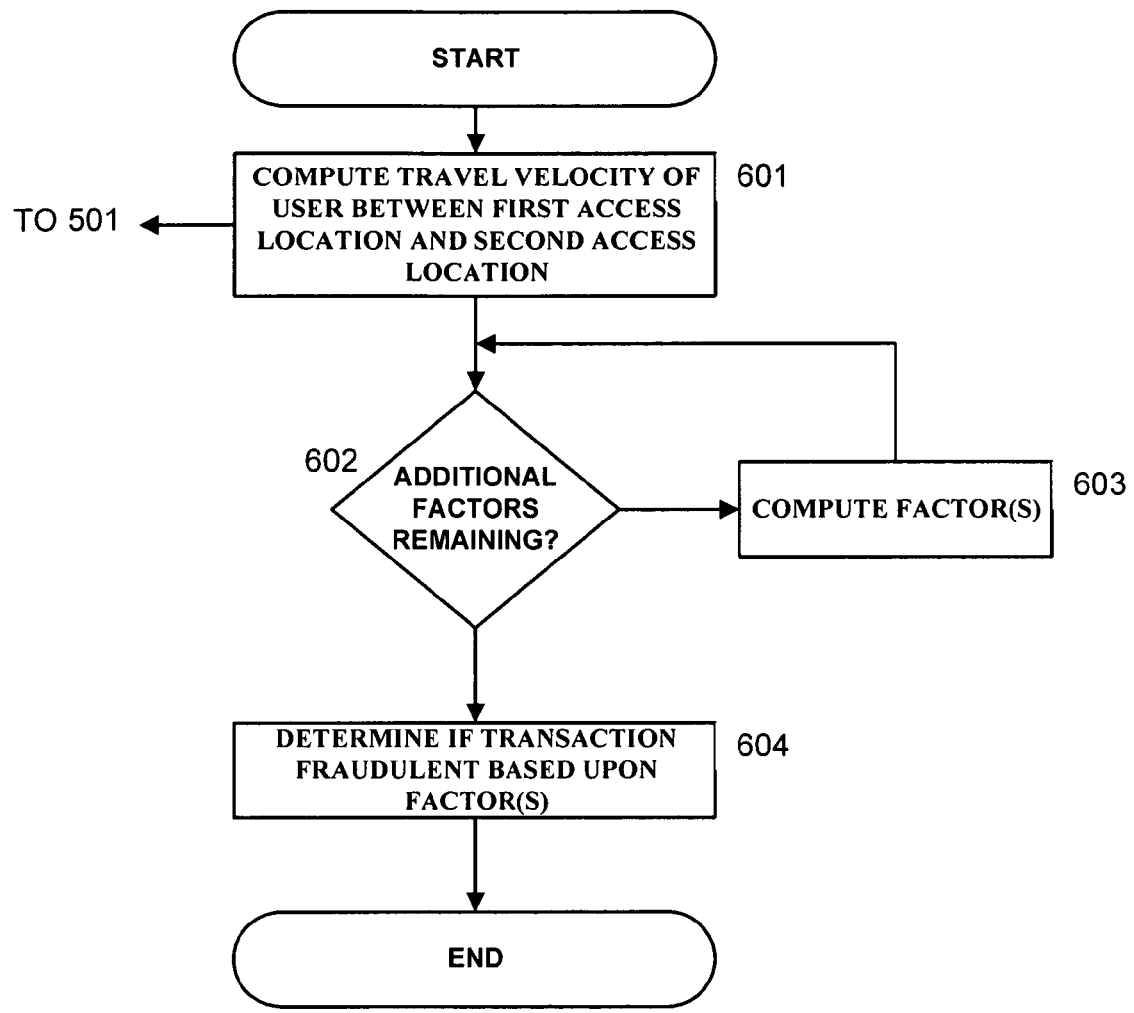
FIG. 6 illustrates one embodiment of the present invention useful for determining a fraudulent transaction using a travel velocity.

One embodiment of a method for determining if a transaction is fraudulent based upon a user's travel velocity is illustrated in FIG. 6. First, the travel velocity of a user is computed 601 between a first access location and a second access location. One embodiment for calculating a user's travel velocity is provided in FIG. 5 in steps 501 through 505. Other methods for computing a travel velocity may also be employed in the embodiment of FIG. 6. The various embodiments included herein for determining a fraudulent transaction may utilize the OFME 202.

Behavior profiles containing one or more factors may be utilized in the embodiment of FIG. 6 and in other embodiments to determine if a transaction is fraudulent, wherein a factor is at least one of an access location, access date, access time, geographical location, domain information, network Id, connection type, one or more IP addresses, user name, email address, debit card number, credit card number, bank account number, social security number, HTTP header information, travel velocity, telephone number, area code, transaction frequency, operating system, processor identification number, natural language, host type, demographic information, or advertising information. Behavior profiles are useful because they allow one or more variables corresponding to one or more factors to be persistently stored, enabling embodiments to determine not only the travel velocity or likelihood of fraud between a first access location and a second access location, but to determine a pattern of fraudulent activity over a plurality of access locations, times, IP addresses, and the like. The behavior profile may be stored in a database such as the behavior tracking database 208 of the embodiment of FIG. 2.

Second, the method of FIG. 6 determines if one or more additional factors based upon the user's IP address will be computed. While only the user's travel velocity need be computed at 601, additional factors, including factors based upon the user's IP address may be used in various embodiments. The types and number of additional factors computed 603 may vary among the different embodiments to optimize the determination of a fraudulent transaction.

If an additional factor is determined to be remaining 602, then that additional factor is computed 603. Next, the method of FIG. 6 then determines 602 and computes 603 remaining additional factors until no factors remain to be computed, causing the method of FIG. 6 to proceed to step 604.

In one embodiment based on the embodiment of FIG. 6, an additional factor computed 603 comprises a country, region, or city associated with the IP address of the user. In another embodiment extending the embodiment of FIG. 6, a factor computed 603 may be a proximity of the user in comparison to a purported location of the user associated with the IP address. A factor computed 603 also may comprise the connection type of the user, such as dial-up, Integrated Services Digital Network (ISDN), cable modem, Digital Subscriber Line (DSL), Digital Signal 1 (T1), or Optical Carrier 3 (OC3). The factor 603 may also comprise a host type, such as personal network end point, corporate network end point, personal or corporate proxy, personal or corporate firewall, and the like.

Additional embodiments extending the embodiment of FIG. 6 may utilize factors supplied by the user, including an address supplied by a client for comparison with an address associated with the IP address, an area code and telephone number supplied by the client for comparison with an area code and telephone number stored in a database associated with the client, or an email address supplied by the client. User supplied factors are useful to various embodiments of the present invention where the embodiments may assume that the user supplied factors are accurate as they are supplied directly by the user.

Further factors may be utilized by the embodiment of FIG. 6, such as where a factor is an access behavior associated with the user based on transaction habits stored in a database that are compared with a current transaction. A factor may also comprise a frequency with which the transaction is attempted or executed within a predetermined amount of time, or a velocity with which a single IP address accesses or uses multiple unique identifiers within a specified period of time.

In further embodiments of FIG. 6, a client may participate in the determination of factors to be computed at 603. For example, in one embodiment, a client may assign a threshold level for one or more of the factors. The client may also create one or more user defined factors, and the client may also define constraint rules for one or more factors. Allowing the user to determine factors, assign threshold levels for factors, and constraint rules for factors allows the method of FIG. 6 to optimally determine if a transaction is fraudulent in a method tailored to the user.

Next, in the embodiment of FIG. 6, the method determines if the transaction is fraudulent based upon the user's travel velocity and zero or more additional factors, such as those described above. The determination 604 that a transaction is fraudulent or legitimate may occur in real time, near real time, or non-real time, based upon the particular implementation of the method of FIG. 6. The user's travel velocity may be a factor utilized by the OFME 202 to determine a fraudulent transaction, and may be stored in a behavior profile residing in a behavior tracking database 208.

Transaction Frequency

In one embodiment of the present invention, a method is provided for determining if a transaction is fraudulent by using a computed transaction frequency. A high transaction frequency may be useful, for example, where a user's personal information has been stolen and distributed to one or more individuals who intend to make multiple fraudulent online purchases with the personal information of the user. A high transaction frequency may indicate a fraudulent transaction where a particular transaction is attempted repeatedly from the same IP address within a predetermined period of time.

Likewise, a transaction may be fraudulent where the same or a similar transaction is attempted or executed multiple times and received by or at a single IP address. For example, suppose a person's credit card information is stolen and distributed among a group of persons who intend to use that information to make fraudulent purchases at a particular online retailer who operates an e-commerce server at a particular IP address. According to one embodiment of the present invention, the frequency with which multiple IP addresses attempt or execute a transaction received at a single IP address, such as the address of an e-commerce server, may indicate that a transaction is fraudulent. In further embodiments, the factors discussed above may be incorporated to determine a fraudulent transaction, such as travel velocity or access behaviors retrieved from user profiles.

Determining if a transaction is fraudulent based transaction frequency has several practical uses, such as stopping and deterring the theft and use of personal information online, which may result from identify theft, phishing emails, hacking, spy ware, Trojans, and the like. Likewise, the same methods may be used to determine if a transaction is legitimate. The embodiment illustrated in FIG. 7 provides one method for utilizing a transaction frequency to determine a fraudulent transaction.

Figure 7:
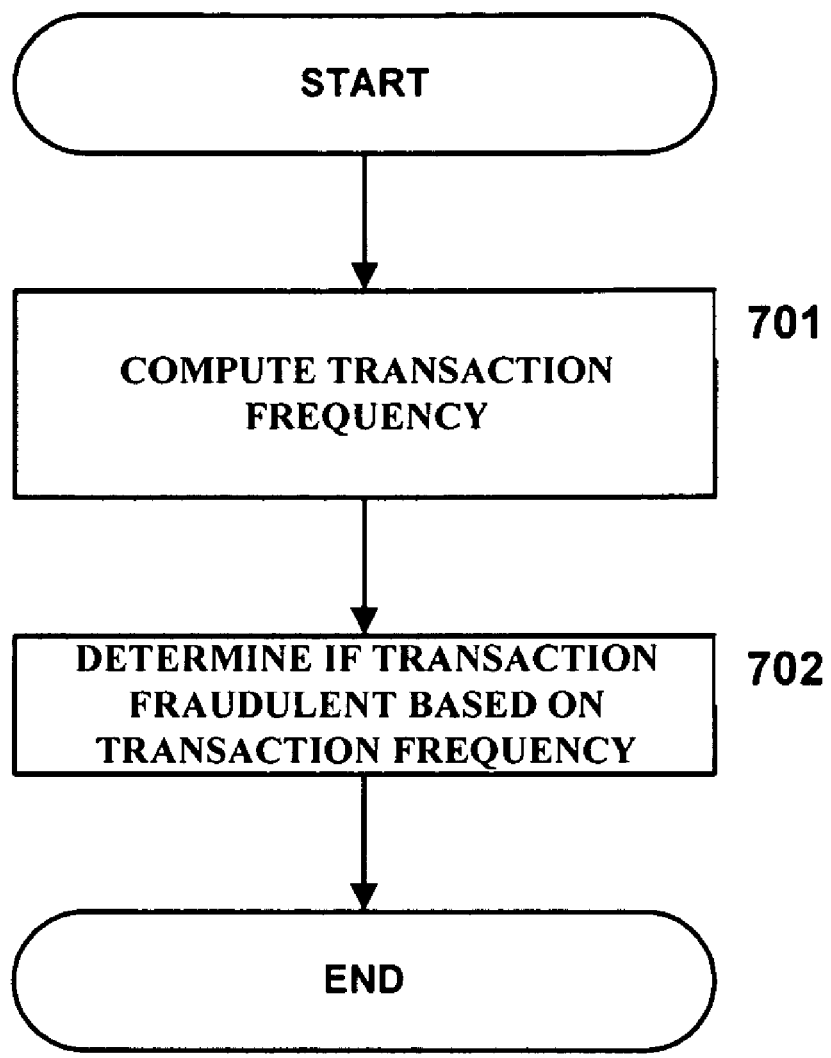
FIG. 7 illustrates one embodiment of the present invention useful for determining a fraudulent transaction using a transaction frequency.

First, in the embodiment of FIG. 7, a frequency is computed with which a transaction is attempted from a first IP address within a predetermined period of time. For example, if an online purchase transaction originating from a first IP address is attempted or executed a hundred times within an hour, then the embodiment of FIG. 7 may determine that the transaction is fraudulent 702 based upon the computed transaction frequency 701.

The transaction frequency 701 may be computed in various ways, including by dividing the number of times a transaction is attempted or executed over the time period in which those transaction were attempted or executed. The transaction frequency may also be a factor utilized by the OFME 202 of the embodiment of FIG. 2, and stored in a behavior profile residing in a behavior tracking database 208, also of FIG. 2.

Transaction frequency in another embodiment may be combined with the host type of the IP address or other factors to enhance the accuracy of the fraud determination. For example, extending the embodiment of FIG. 7, suppose that one or more transactions have been attempted from an IP address one hundred times within an hour. Without other information, a transaction frequency of 100 attempts per hour from an IP address may indicate a fraudulent transaction. However, if that IP address represents a network proxy or firewall which provides Internet access to multiple users, then a transaction frequency of 100 attempts per hour may in fact not indicate a likely fraudulent transaction. Therefore, comparing the transaction frequency to the host type of the IP address can optimize the fraud determination by decreasing false positives when the IP address represents a proxy, firewall, or other Internet gateway which provides access for multiple users, several of whom may be conducting one or more legitimate transactions. Other factors such as connection type, travel velocity, information retrieved from a behavior profile, geographic location, user supplied factors, and the like, may also be combined with transaction frequency to enhance the accuracy of the fraud determination.

Authentication Using a Smart Cookie

In embodiments of the present invention, methods are provided for authenticating a transaction using a cookie and a behavior profile associated with a user. The cookie can be described as a 'smart' cookie because it resides on a client device and stores information from a behavior profile associated with a user. Thus, contents of the cookie are tied to a behavior profile, providing a robust back-end authentication analysis. Authenticating a transaction has several practical uses, including determining a fraudulent transaction, network analysis, user profiling, user account verification and tracking, network access provider analysis, and advertising. Further, the cookie of the present invention may be utilized by the OFME 202 to determine a fraudulent transaction.

Figure 10:
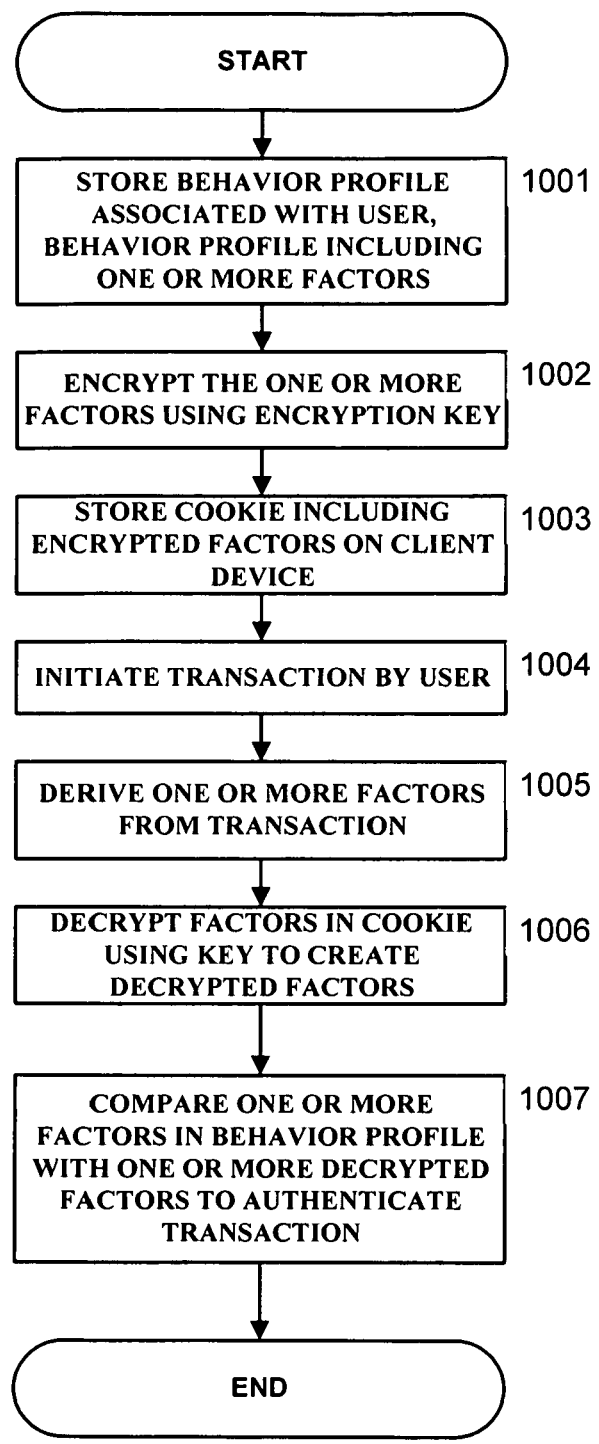
FIG. 10 illustrates one embodiment of the present invention useful for authenticating a transaction.

One embodiment of the present invention useful for authenticating a transaction using a smart cookie is provided in FIG. 10. First in the embodiment of FIG. 10, a behavior profile associated with a user is stored 1001 on a server, with the behavior profile including one or more factors associated with the user. The server of various embodiments of the present invention includes the devices described in the embodiment of FIG. 8, such as computing device 801. The behavior profile of various embodiments may be stored at any location, including a server, an intermediate server, an authentication server, or a client device. The behavior profile of various embodiments of the present invention includes one or more factors associated with the user, wherein a factor is at least one of an access location, access date, access time, geographical location, domain information, network Id, connection type, one or more IP addresses, user name, email address, debit card number, credit card number, bank account number, social security number, HTTP header information, travel velocity, telephone number, area code, transaction frequency, operating system, processor identification number, natural language, host type, demographic information, or advertising information. The behavior profile also includes an encryption key associated with the user. In various embodiments, the encryption key can be chosen by the user or generated for the user.

Second in the current embodiment, the one or more factors associated with the user are encrypted 1002 using the encryption key to create one or more encrypted factors. Any suitable encryption algorithm can be used in the embodiments of the present invention to encrypt the one or more factors, including private key encryption algorithms such as DES and public key encryption algorithms such as RSA.

Fourth in the current embodiment, the user initiates 1004 a transaction using the client device, and one or more factors are derived 1005 from the transaction. The client device of embodiments of the present invention includes the devices described in the embodiment of FIG. 8, such as computing device 801. Sixth, the one or more factors stored in the cookie are decrypted 1006 using the encryption key to create one or more decrypted factors. Finally, in the current embodiment, the transaction is authenticated 1007 by comparing the one or more factors in the behavior profile with the one or more decrypted factors.

In an embodiment of the present invention extending the embodiment of FIG. 10, the transaction is authenticated by comparing the one or more decrypted factors with the one or more factors derived from the transaction. In yet a further embodiment, the transaction is authenticated by comparing the one or more factors in the behavior profile, the one or more decrypted factors, and the one or more factors derived from the transaction. Additionally, the connection type factor of the embodiments can include at least one of dial-up, Integrated Services Digital Network (ISDN), cable modem, Digital Subscriber Line (DSL), Digital Signal 1 (T1), or Optical Carrier 3 (OC3). The host type factor of the embodiments includes at least one of network end point, network proxy, or network firewall.

Figure 11:
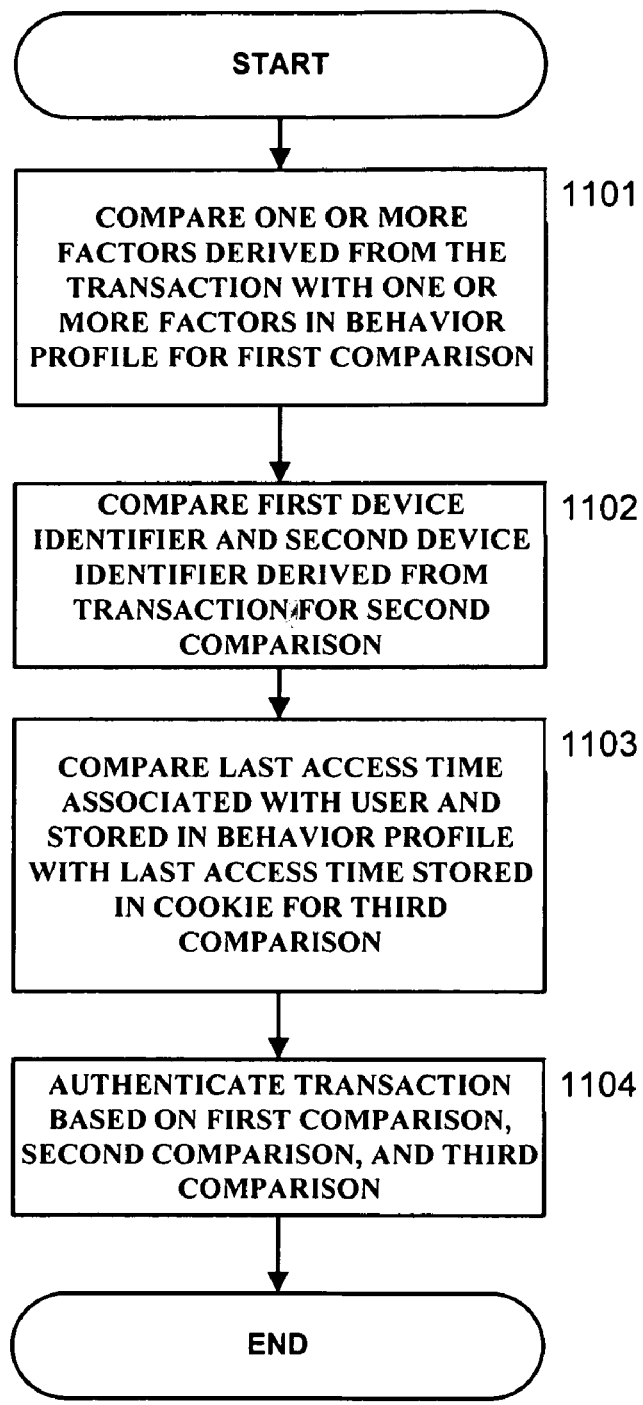
FIG. 11 illustrates a further embodiment of the present invention useful for authenticating a transaction.

Another embodiment of the present invention useful for authenticating a transaction is described in FIG. 11, which illustrates a method for authenticating a transaction performed by a user operating a client device which contains a cookie, the cookie including at least a first identifier associated with the client device, and wherein a behavior profile is associated with the user and stored on a server. First in the embodiment of FIG. 11, a first comparison is performed 1101 between one or more factors derived from the transaction and one or more factors stored in the behavior profile. Next, a second comparison is performed 1102 between the first device identifier and a second device identifier derived from the transaction. Device identifiers in embodiments of the present invention include HTTP header information such as the 'User Agent' string which identifies a web browser. Device identifiers in various embodiments may also be derived from any system information useful for identifying a client device, including information describing the software or the hardware of the client device.

Third in the embodiment of FIG. 11, a third comparison is performed 1103 between a last access time associated with the user which is stored in the behavior profile and a last access time stored in the cookie. Finally, the transaction is authenticated 1104 based on the first comparison, the second comparison, and the third comparison.

In an embodiment of the present invention extending the embodiment of FIG. 11, the behavior profile includes a unique identifier associated with the user. Unique identifiers in embodiments of the present invention include user name, user password, debit card number, bank account number, social security number, or any information useful to uniquely identify a user as understood by one of skill in the art.

In additional embodiments extending the embodiment of FIG. 11, the contents of the cookie are encrypted, and a key to decrypt the cookie is stored in the behavior profile associated with the user. It is further contemplated that the transaction may be authenticated based on the first comparison, the second comparison, the third comparison, and a comparison between an IP address associated with the transaction and a plurality of IP addresses stored in the cookie.

Figure 12:
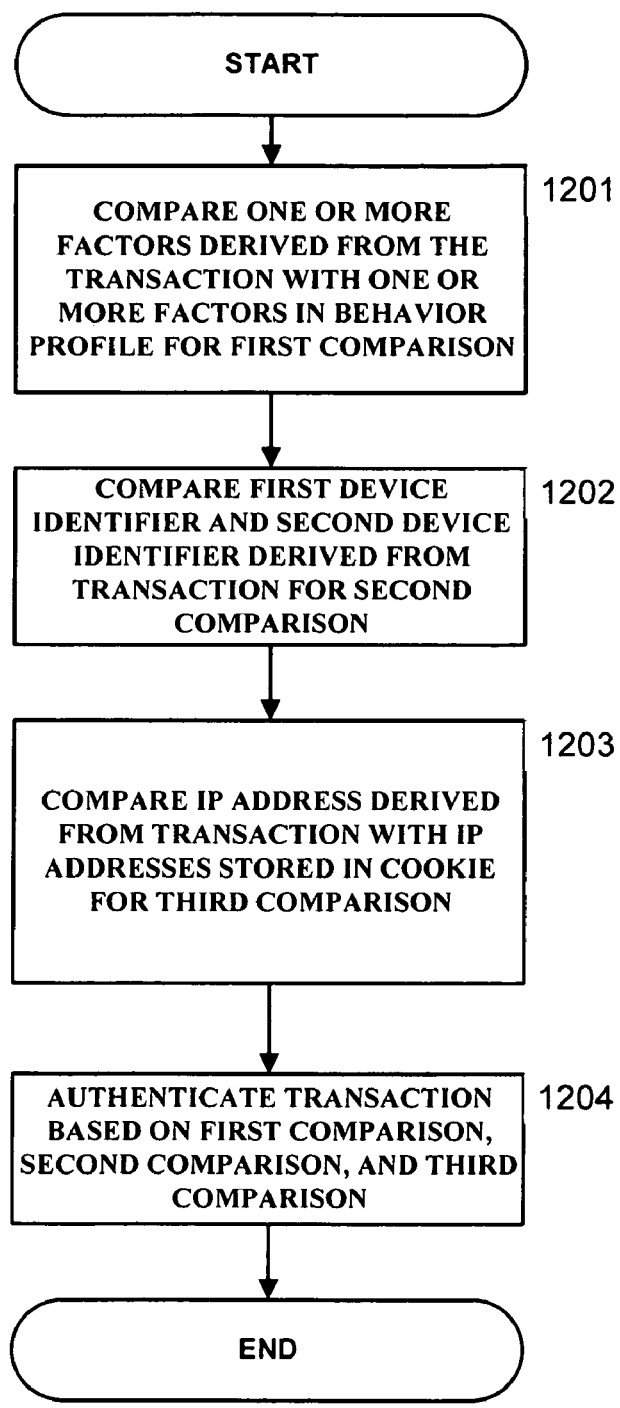
FIG. 12 illustrates yet another embodiment of the present invention useful for authenticating a transaction.

Another embodiment of the present invention useful for authenticating a transaction is described in FIG. 12, which illustrates a method for authenticating a transaction performed by a user operating a client device which contains a cookie, the cookie including at least a first identifier associated with the client device, and wherein a behavior profile is associated with the user and stored on a server. In the embodiment of FIG. 12, a first comparison is performed 1201 between one or more factors derived from the transaction and one or more factors stored in the behavior profile. Second, a second comparison is performed 1202 between the first device identifier and a second device identifier derived from the transaction.

A third comparison is then performed 1203 in the embodiment of FIG. 12 between an IP address derived from the transaction and a plurality of IP addresses stored in the cookie. Finally, the transaction is authenticated 1204 based on the first comparison, the second comparison, and the third comparison.

In an embodiment extending FIG. 12, the behavior profile may include a unique identifier associated with the user. In a further extending embodiment, the contents of the cookie are encrypted and a key to decrypt the cookie is be stored in the behavior profile, enabling the contents of the cookie to be decrypted.

While the invention has been described in detail in connection with exemplary embodiments, it should be understood that the invention is not limited to the above-disclosed embodiments. Rather, the invention can be modified to incorporate any number of variations, alternations, substitutions, or equivalent arrangements not heretofore described, but which are commensurate with the spirit and scope of the invention. Specific embodiments should be taken as exemplary and not limiting. For example, the present invention may be used in a web-based application. Accordingly, the invention is not limited by the foregoing description or drawings, but is only limited by the scope of the appended claims.

The invention claimed is:

1. A method for authenticating a transaction, the method comprising the steps of:
   a. storing on a server a behavior profile associated with a user, the behavior profile including one or more factors associated with the user, the behavior profile also including an encryption key associated with the user;
   b. encrypting the one or more factors using the encryption key to create one or more encrypted factors;
   c. storing a cookie on a client device, the cookie including the one or more encrypted factors;
   d. initiating by the user the transaction using the client device;
   e. deriving one or more factors from the transaction;
   f. decrypting the one or more factors stored in the cookie using the encryption key to create one or more decrypted factors; and
   g. authenticating the transaction by comparing the one or more factors in the behavior profile with the one or more decrypted factors.

2. The method of claim 1, wherein the authenticating step comprises authenticating the transaction by comparing the one or more decrypted factors with the one or more factors derived from the transaction.

3. The method of claim 1, wherein the authenticating step comprises authenticating the transaction by comparing the one or more factors in the behavior profile, the one or more decrypted factors, and the one or more factors derived from the transaction.

4. The method of claim 1, wherein a factor is at least one of an access location, access date, access time, geographical location, domain information, network Id, connection type, one or more IP addresses, user name, email address, debit card number, credit card number, bank account number, social security number, HTTP header information, travel velocity, telephone number, area code, transaction frequency, operating system, processor identification number, natural language, host type, demographic information, or advertising information.

5. The method of claim 4, wherein connection type is at least one of dial-up, Integrated Services Digital Network (ISDN), cable modem, Digital Subscriber Line (DSL), Digital Signal 1 (T1), or Optical Carrier 3 (OC3).

6. The method of claim 4, wherein host type is one or more of network end point, network proxy, or network firewall.

7. A method for authenticating a transaction, the method comprising the steps of:
   a. storing on a server a behavior profile associated with a user, the behavior profile including behavior profile factors comprising a connection type and a host type associated with the user, the behavior profile also including an encryption key associated with the user;
   b. encrypting the behavior profile factors comprising the connection type and the host type using the encryption key to create encrypted factors;
   c. storing a cookie on a client device, the cookie including the encrypted factors;
   d. deriving a connection type and a host type from the transaction to create transaction factors;
   e. decrypting the connection type and the host type stored in the cookie to create decrypted factors; and
   f. authenticating the transaction by comparing the behavior profile factors, the transaction factors, and the decrypted factors.

8. The method of claim 7, wherein connection type is at least one of dial-up, Integrated Services Digital Network (ISDN), cable modem, Digital Subscriber Line (DSL), Digital Signal 1 (T1), or Optical Carrier 3 (OC3).

9. The method of claim 7, wherein host type is one or more of network end point, network proxy, or network firewall.

10. A method for authenticating a transaction, the method comprising the steps of:
   a. storing on a server a behavior profile associated with a user, the behavior profile including behavior profile factors comprising a host type and an IP address associated with the user, the behavior profile also including an encryption key associated with the user, and wherein host type is one or more of network end point, network proxy, or network firewall;
   b. encrypting the behavior profile factors comprising the host type and the IP address using the encryption key to create encrypted factors;
   c. storing a cookie on a client device, the cookie including the encrypted factors;
   d. deriving a host type and an IP address from the transaction to create transaction factors;
   e. decrypting the host type and the IP address stored in the cookie to create decrypted factors; and
   f. authenticating the transaction by comparing the behavior profile factors, the transaction factors, and the decrypted factors.

* * * * *